July 3, 1956  E. R. WILLIAMS  2,753,046
METHOD AND APPARATUS FOR TREATING PETROLEUM PRODUCTS
Filed July 9, 1952  2 Sheets-Sheet 2

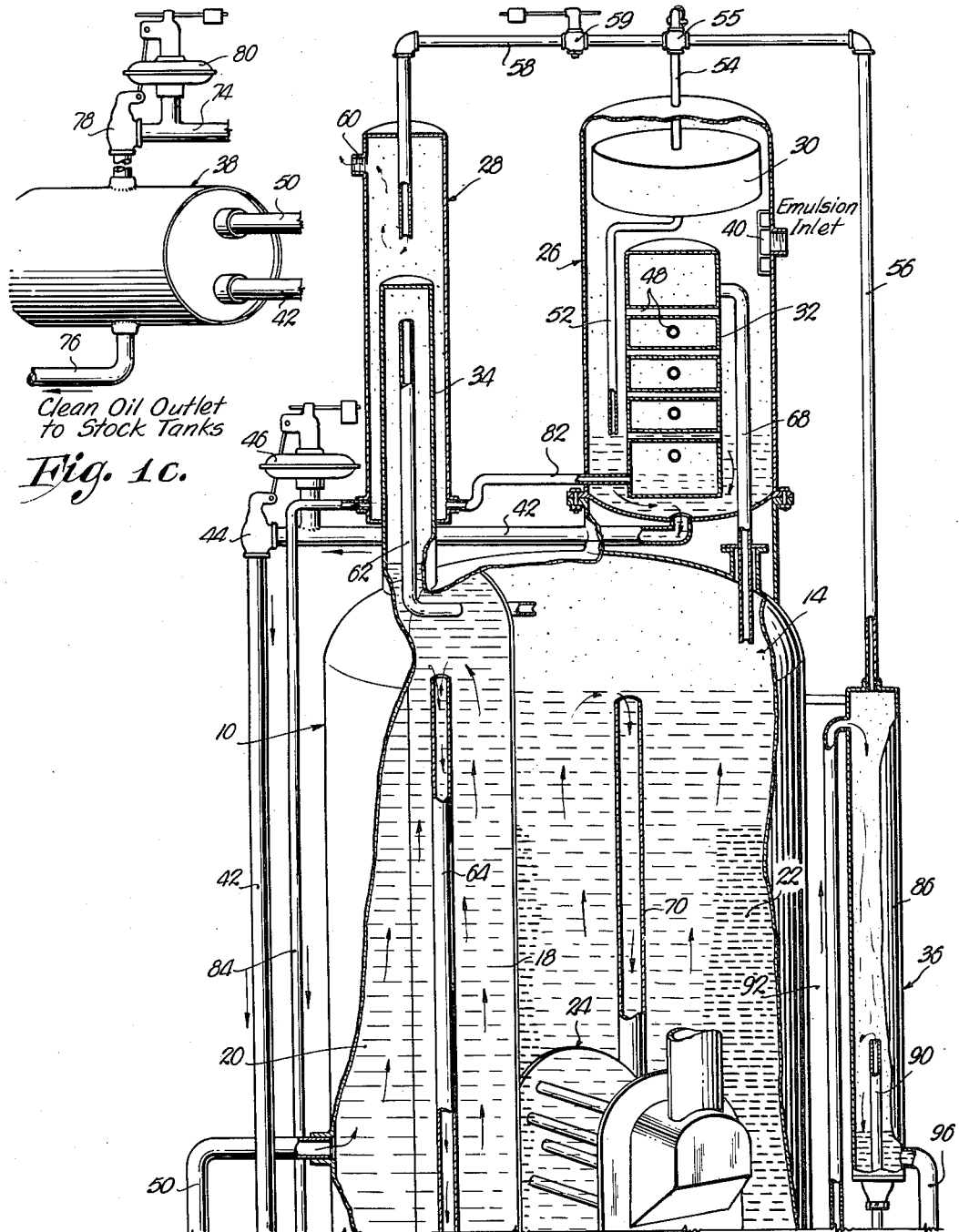

INVENTOR.
Elmer R. Williams
BY
ATTORNEY.

United States Patent Office 2,753,046
Patented July 3, 1956

2,753,046

METHOD AND APPARATUS FOR TREATING PETROLEUM PRODUCTS

Elmer R. Williams, Tulsa, Okla., assignor to Forrest Lee Murdock, Sr., Tulsa, Okla.

Application July 9, 1952, Serial No. 297,814

10 Claims. (Cl. 210—52.5)

This invention relates to the treatment of petroleum products, particularly those emulsified types of oils emanating directly from natural wells and having a water content that includes not only free water that is rather easily removed but bound water emulsified therein, the primary object being to provide apparatus and a novel method for removing all of such water prior to storage or other use of the clean oil.

It is the most important object of the present invention to provide a method of removing water from emulsion emanating from natural oil wells by treating the emulsion to knock out free water and to remove additional water by settling, collecting the gas and steam that emanates from the emulsion during treatment thereof to remove said free and said additional water, condensing the gas and steam and returning the composite condensate to the oil for removal of the water content thereof by settling and for mixing of the gasoline content thereof with the oil.

Another important object of the present invention is to provide one type of apparatus capable of carrying out the aforesaid method.

A further object of the present invention is to provide a method and a treater for carrying out the method for condensing gas and steam emanating from the emulsion during the water removal steps and wherein the cold emulsion flowing into the treater is used as the condensing medium, thereby limiting the necessity of a separate condenser unit having its own cooling system.

Another object hereof is to provide means whereby the emulsion may be pre-heated prior to knocking out of free water after the cold emulsion is used for condensing purposes as aforesaid, the hot oil emanating from the treater being in turn used as a pre-heating medium prior to direction of the clean oil to stock tanks or the like.

A further object hereof is to provide a treater wherein all of the wet gas rising from the emulsion and capable of being condensed, is collected and therefore, saved for conversion into a liquid form whereby the same may be, and is, returned to the finished product in accordance with the present invention, thereby appreciably raising the value of the latter.

Another object hereof is to provide in a treating system for said emulsion, means all within a single unit for knocking out free water, heating the emulsion to release the bound water therein, removal of a large quantity of the released water during the heating thereof, and thereupon settling of the remaining water from the emulsion, all in a continuous flow, closed pressure system, the last mentioned settling step being also utilized as a means for removing the water condensate from the gasoline condensate so that the latter is mixed with the clean oil prior to storage.

This is a continuation in part of my co-pending United States application, Serial No. 46,496, filed August 27, 1948, titled "Apparatus For Treating Emulsion Emanating From Natural Oil Wells," and issued December 2, 1952, as United States Letters Patent No. 2,620,043, and a continuation-in-part of my copending United States application, Serial No. 143,478, filed February 10, 1950, titled "Apparatus For Siphoning Water From Oil Treating Structure," and issued January 6, 1953, as United States Letters Patent No. 2,624,462.

In the drawings:

Figure 1a is a fragmentary, side elevational view of the uppermost portion of treating apparatus for petroleum products forming the subject matter of the present invention, and illustrating one form of apparatus for carrying out the method hereinafter set forth, parts being broken away and in section to reveal details of construction.

Fig. 1c is a perspective view of the remaining structural components of the treater and including a heat exchanger as hereinafter to be made clearer.

Figure 1B:
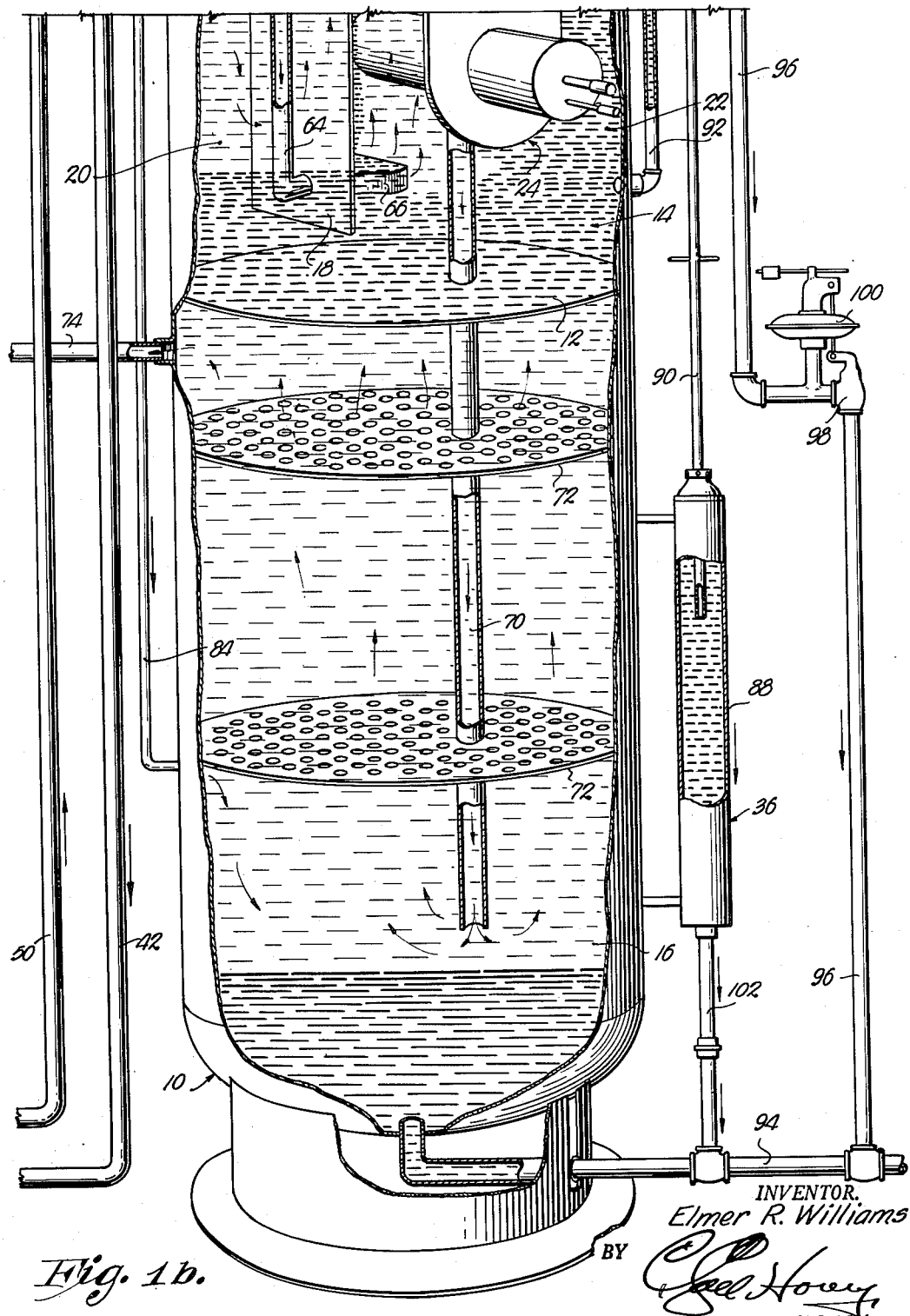
Fig. 1b is a view similar to Fig. 1a, but showing the remaining lowermost portion of the treater.

The apparatus chosen for illustration of one type of structure for carrying out the novel method hereinafter outlined, is illustrated in the drawings and includes a primary, upright, preferably cylindrical, closed tank broadly designated by the numeral 10 and having a horizontal partition 12 intermediate the ends thereof, presenting therefore, an uppermost heater compartment 14 and a lowermost settling compartment 16.

A vertical baffle 18 in the uppermost heating compartment 14, is spaced above the uppermost surface of the partition 12 as shown in Fig. 1b, presenting a free water knock-out chamber 20 and a heating chamber 22 on opposite sides respectively of the vertical baffle 18. The heating chamber 22 is provided with a heating element in the nature of a furnace 24, spaced above the lowermost extremities of the baffle element 18.

A drum-like separator 26 and a tubular collector 28 are carried out by the top wall of the tank 10 and placed into communication with the latter in various ways as hereinafter described. The separator 26 has a mist extractor 30 and a condenser 32 therewithin and the collector 28 is provided with a tube 34 extending thereinto, communicating with the tank 10 but closed off from the outermost tubular shell forming a part of the collector 28 as is clear in Fig. 1a.

Water siphoning means, broadly designated by the numeral 36, is provided for the compartments 14 and 16 and a heat exchanger 38 located preferably adjacent the base end of the tank 10, is coupled with the latter and with the separator 26.

The cold emulsion emanating either directly from a natural oil well or from storage means therefor, is directed into the separator 26, past a diverter box 40 above the condenser 32 for free flow thereover, and to an outlet pipe 42 for the separator 26 having a valve 44 therein that is operated by a pressure-type diaphragm control 46. The condenser 32 is specially chosen in that the same is provided with a plurality of crisscross pipes 48 through which the cold emulsion may flow as it travels from the diverter box 40 to the outlet pipe 42. Outlet pipe 42 is coupled with the heat exchanger 38 and the latter in turn being coupled with the free water knockout chamber 20 above the lowermost end of the baffle 18 by a line 50.

The free water within the pre-heated emulsion settles immediately within the chamber 20 and the gas and steam rising therefrom within the chamber 20, is collected by the tube 34, such gas and steam being wet inasmuch as the loose ends rise within the separator 26 as the emulsion flows thereinto. These free ends pass through the mist extractor 30 where liquid is removed and re-directed into the separator 26 by means of a pipe 52 depending from the mist extractor 30. The relatively dry loose ends pass upwardly from the mist extractor 30, through a pipe 54 having a safety relief valve 55, a branch 56 coupled with the siphoning means 36 for pressure equalizing purposes, and a branch 58, provided with a back pressure valve 59 communicating with the collector 28, the latter being provided with a gas outlet 60.

The wet gas and steam emanating from the emulsion in the free water knock-out chamber 20 are directed to the heater chamber 22 by means of an L-shaped conduit 62 having one leg thereof within the inner tube 34 of collector 28 and the other leg thereof extending through the baffle 18, at the uppermost end thereof and well above the level of liquid in the compartment 14. A downcomer 64 within the chamber 20 receives the emulsion from the latter and directs the same into the chamber 22, the downcomer 64 passing through the baffle 18 adjacent the lowermost end thereof as shown in Fig. 1b and being provided with a diverter box 66, as shown in Fig. 1b. The emulsion bubbles up through the settled water and emulsion within the chamber 22 as it washes over the furnace 24, such heating operating to release the bound water, a substantial amount whereof settles out within the chamber 22 and mixes with the free water previously removed within the chamber 20. Such heating releases all of the remaining gas and such gas, together with steam, rises above the level of liquid within the chamber 22, mixes with the gas and steam emanating from the conduit 62 and passes into the condenser 32 by means of a conduit 68. Note that the lowermost end of the conduit 68 is likewise well above the level of liquid in the chamber 22 that is determined by the disposition of the uppermost end of a downcomer 70 within the chamber 22.

It is to be noted that both of the downcomers 64 and 70 are disposed within their respective chambers 20 and 22 so that there is no heat lost in the transfer of the emulsion from one chamber to another and from one compartment to another. Fig. 1b of the drawing illustrates the way in which the downcomer 70 passes through the partition 12, through a plurality of horizontal perforated baffles 72 in the compartment 16, and terminates in a lowermost open end well above the base of the tank 10.

The clean oil rising above the settled water in the settling compartment 16, is directed to the heat exchanger 38 for pre-heating the emulsion emanating from the separator 26 by means of a pipe 74, such clean oil being taken from the separator 38 by means of a tube 76 for feeding into stock tanks or the like. The pipe 74 has a valve 78 therein that is operated by a pressure control 80 (see Fig. 1c).

The gasoline and water condensate emanating from the condenser 32 is fed by means of a pipe 82 to the separator 28 exteriorly of the tube 34 where such liquid condensate is subjected to the gas pressure within the outer shell of the collector 28. From the collector 28, the liquid condensate flows by means of a conduit 84 to the settling compartment 16 of tank 10 intermediate the ends of the compartment 16 well below the outlet pipe 74 but preferably above the lowermost end of the downcomer 70.

The siphoning means 36 includes an upper elongated, tubular container 86 and a lowermost container 88 interconnected by a vertically reciprocable control tube 90, the branch 56 being coupled with the container 86 at the uppermost end of the latter. Water is drained from the compartment 14 by means of a pipe 92 connected to the container 86 at the uppermost end thereof, and to the compartment 14 just above the partition 12. Water from the container 86 is connected with a drain line 94 for the compartment 16 by means of a pipe 96 having a valve 98 operated by a pressure-type control 100. The lower container 88 is likewise joined to the drain pipe 94 by means of a line 102 depending therefrom.

The precise operation of the siphoning means 36 forms no part of this invention and therefore, need not be further described, it being necessary to merely point out that a predetermined level of water may be maintained in each of the compartments 14 and 16 at all times, notwithstanding the fact that the initial water content of the emulsion emanating from the well will vary during continuous pumping. Such water levels should of course, be below the uppermost ends of downcomers 64 and 70, and preferably below the lowermost end of downcomer 70. The water level of chamber 22 will be well above the furnace 24, but the water level within chamber 20 will be maintained slightly above the lowermost end of the downcomer 64.

The method of treating emulsion in accordance with the present invention, may be outlined in the following description of operation. Inasmuch as in virtually all wells the output thereof contains a substantial amount of free water, it is to be preferred to remove the latter as an initial step of the treating process, thereby obviating the necessity of directing the entire volume of emulsion over the heating element 24. Such free water separates more readily if the emulsion is pre-heated and therefore, since the heat of the oil emanating from the settling compartment 16 is otherwise wasted, it is economical to utilize the heat exchanger 38 as a means of pre-heating the cold emulsion by the hot oil before the emulsion enters the free water knock-out chamber 20.

Saving of expense also dictates condensation of gas and steam emanating from the emulsion being treated by the cold emulsion itself rather than by a separate cooling medium and, therefore, prior to the pre-heating step within the heat exchanger 38, the cold emulsion is fed directly to the condenser 32. It may be pointed out at this juncture that the condensing step of the treating method hereof, is also highly important to the producer because the value of the finished product is tremendously raised if the gasoline condensate is remixed with the clean oil prior to storage and/or use.

Thus, as is above clear, the cold emulsion is directed to the separator 26 over the condenser 32, thence to the heat exchanger 38 by way of the pipe 42 and, finally into the free water knock-out chamber 20 by way of line 50. The close proximity of the free water knock-out chamber 20 to the heating chamber 22, also operates to further heat the emulsion after leaving the heat exchanger 38 and before passage to the heating chamber 22, whereby a substantial amount of water is knocked out of the emulsion immediately upon its entry into the tank 10. At this point, a rather large amount of gas and steam rises from the emulsion within the chamber 20 which is collected in the inner tube 34 and directed to the chamber 22 by means of the conduit 62. The emulsion flows to the chamber 22 by means of downcomer 64, where it receives a hot bath as above explained, through the hot salt water within the chamber 22 and here again, a substantial amount of the released water is settled out within the chamber 22 prior to the passage of the emulsion into the settling compartment 16 by way of downcomer 70. The steam and gas emanating from the emulsion in the heating compartment 22, is also collected; it mixes with the gas and steam emanating from the conduit 62, and all of the collected vapor is passed into the condenser 32 by way of conduit 68.

The treater hereof utilizes all of the basic laws of nature. For instance, by locating the collector 28 and the separator 26 above the levels of liquid within the compartment 14, such vapors rise naturally into the condenser 32. Inasmuch as the condensate from the condenser 32 includes a substantial amount of water, the settling compartment 16 is utilized as a means of removing such water condensate for eventual disposal by means of drain 94, the gas condensate mixing with the clean oil and passing therewith to the heat exchanger 38 by way of pipe 74. The pipe 82 and the conduit 84 serve to direct such condensate from the condenser 32 to the compartment 16, as aforementioned.

Having thus described the invention what is claimed as new and desired to be secured by Letters Patent is:

1. Apparatus for treating emulsion emanating from natural oil wells, said apparatus comprising a tank having a horizontal partition, presenting a heater compartment above the partition having heating means therein and a settling compartment below the partition; a separator for initially receiving cold emulsion to be treated; means connecting said heater compartment with the separator for directing the emulsion from the latter to the heater compartment; a condenser in the separator within the path of travel of said cold emulsion therethrough and in heat exchange relationship therewith; means interconnecting said compartments for directing the emulsion from the heater compartment to the settling compartment; means connecting said condenser with the heater compartment for directing gas and steam emanating from the emulsion in the heater compartment to the condenser; and means interconnecting the condenser and the settling compartment for directing to the latter all gasoline and water condensed from said gas and steam respectively in said condenser as a result of the cooling of the condenser and the gas and steam therein by said cold emulsion.

2. Apparatus for treating emulsion emanating from natural oil wells, said apparatus comprising a tank having a horizontal partition, presenting a heater compartment above the partition having heating means therein and a settling compartment below the partition; a separator above the tank for initially receiving cold emulsion to be treated; means connecting said heater compartment with the separator for directing the emulsion from the latter to the heater compartment; a condenser in the separator within the path of travel of said cold emulsion therethrough and in heat exchange relationship therewith; means interconnecting said compartments for directing the emulsion from the heater compartment to the settling compartment; means connecting said condenser with the heater compartment for directing gas and steam rising from the emulsion in the heater compartment to the condenser; and means interconnecting the condenser and the settling compartment for directing to the latter all gasoline and water condensed from said gas and steam respectively in said condenser as a result of the cooling of the condenser and the gas and steam therein by said cold emulsion.

3. Apparatus for treating emulsion emanating from natural oil wells, said apparatus comprising a tank having a horizontal partition, presenting a heater compartment above the partition having heating means therein and a settling compartment below the partition; a separator for initially receiving cold emulsion to be treated; means connecting said heater compartment with the separator for directing the emulsion from the latter to the heater compartment; a condenser in the separator within the path of travel of said cold emulsion therethrough and in heat exchange relationship therewith; means interconnecting said compartments for directing the emulsion from the heater compartment to the settling compartment; means connecting said condenser with the heater compartment for directing gas and steam emanating from the emulsion in the heater compartment to the condenser; means interconnecting the condenser and the settling compartment for directing to the latter all gasoline and water condensed from said gas and steam respectively in said condenser as a result of the cooling of the condenser and the gas and steam therein by said cold emulsion; and siphoning means coupled with said compartments for removing water therefrom.

4. Apparatus for treating emulsion emanating from natural oil wells, said apparatus comprising a tank having a horizontal partition, presenting an upper compartment above the partition and a settling compartment below the partition; a vertical baffle in the upper compartment setting off a heater chamber having heating means therein and a free water knock-out chamber; a separator for initially receiving cold emulsion to be treated; means connecting the separator with said free water knock-out chamber for directing the emulsion to the latter from said separator; a condenser in the separator within the path of travel of said cold emulsion therethrough and in heat exchange relationship therewith; means interconnecting said chambers for directing the emulsion from the free water knock-out chamber to the heater chamber; means connecting the settling compartment with the heater chamber for directing the emulsion from the latter to the settling tank; means connecting said condenser with said chambers for directing gas and steam emanating from the emulsion in the chambers to the condenser; and means interconnecting the condenser and the settling compartment for directing to the latter all gasoline and water condensed from said gas and steam respectively in said condenser as a result of the cooling of the condenser and the gas and steam therein by said cold emulsion.

5. Apparatus for treating emulsion emanating from natural oil wells, said apparatus comprising a tank having a horizontal partition, presenting an upper compartment above the partition and a settling compartment below the partition; a vertical baffle in the upper compartment setting off a heater chamber having heating means therein and a free water knock-out chamber; a separator for initially receiving cold emulsion to be treated; means connecting the separator with said free water knock-out chamber for directing the emulsion to the latter from said separator; means for heating the emulsion as it flows from the separator to the free water knock-out chamber; a condenser in the separator within the path of travel of said cold emulsion therethrough and in heat exchange relationship therewith; means interconnecting said chambers for directing the emulsion from the free water knock-out chamber to the heater chamber; means connecting the settling compartment with the heater chamber for directing the emulsion from the latter to the settling tank; means connecting said condenser with said chambers for directing gas and steam emanating from the emulsion in the chambers to the condenser; and means interconnecting the condenser and the settling compartment for directing to the latter all gasoline and water condensed from said gas and steam respectively in said condenser as a result of the cooling of the condenser and the gas and steam therein by said cold emulsion.

6. Apparatus for treating emulsion emanating from natural oil wells, said apparatus comprising a tank having a horizontal partition, presenting an upper compartment above the partition and a settling compartment below the partition; a vertical baffle in the upper compartment setting off a heater chamber having heating means therein and a free water knock-out chamber; a separator for initially receiving cold emulsion to be treated; means connecting the separator with said free water knock-out chamber for directing the emulsion to the latter from said separator; a heat exchanger interposed in said last mentioned means; a condenser in the separator within the path of travel of said cold emulsion therethrough and in heat exchange relationship therewith; means interconnecting said chambers for directing the emulsion from the free water knock-out chamber to the heater chamber; means connecting the settling compartment with the heater chamber for directing the emulsion from the latter to the settling tank; means connecting said condenser with said chambers for directing gas and steam emanating from the emulsion in the chambers to the condenser; means interconnecting the condenser and the settling compartment for directing to the latter all gasoline and water condensed from said gas and steam respectively in said condenser as a result of the cooling of the condenser and the gas and steam therein by said cold emulsion; and means interconnecting said heat exchanger and the settling tank for directing oil from the latter to the heat exchanger to heat the emulsion as the same flows from the separator to the free water knock-out chamber.

7. In the method of treating cold emulsion emanating from natural oil wells, said method including the steps of heating the emulsion; separating the water removed from the remaining emulsion; collecting gas and steam emanating from the emulsion as the free water is settled out; bringing said cold emulsion into heat exchange relationship with the collected gas prior to heating the emulsion to condense the gas and steam; separating the water in said remaining emulsion from the resultant oil initially contained in the cold emulsion; directing the gasoline and water condensate into said oil; and separating the water condensate from said oil and gasoline.

8. In the method of treating cold emulsion emanating from natural oil wells, said method including the steps of heating the emulsion; separating the water removed from the remaining emulsion; collecting gas and steam emanating from the emulsion as the free water is settled out; bringing said cold emulsion into heat exchange relationship with the collected gas prior to heating the emulsion to condense the gas and steam; separating the water in said remaining emulsion from the resultant oil initially contained in the cold emulsion; directing the gasoline and water condensate into said oil; separating the water condensate from said oil and gasoline; and bringing said oil and gasoline into heat exchange relationship with the cold emulsion after the latter is utilized to condense said water and gasoline, and before said first mentioned heating of the emulsion to preheat the latter.

9. In the method of treating cold emulsion emanating from natural oil wells, said method including the steps of knocking out free water from the emulsion; separating the free water from the remaining emulsion; heating the remaining emulsion; separating the additional water removed from the residual emulsion; collecting gas and steam emanating from the emulsion as the free water is settled out; bringing said cold emulsion into heat exchange relationship with the collected gas prior to knocking out free water from the emulsion to condense the gas and steam; settling out the remaining water in said residual emulsion; separating the remaining water from the resultant oil initially contained in the cold emulsion; directing the gasoline and water condensate into said oil; and separating the water condensate from said oil and gasoline.

10. In the method of treating cold emulsion emanating from natural oil wells, said method including the steps of knocking out free water from the emulsion; separating the free water from the remaining emulsion; heating the remaining emulsion; separating the additional water removed from the residual emulsion; collecting gas and steam emanating from the emulsion as the free water is settled out; bringing said cold emulsion into heat exchange relationship with the collected gas prior to knocking out free water from the emulsion to condense the gas and steam; settling out the remaining water in said residual emulsion; separating the remaining water from the resultant oil initially contained in the cold emulsion; directing the gasoline and water condensate into said oil; separating the water condensate from said oil and gasoline; and bringing said oil and gasoline into heat exchange relationship with the cold emulsion after the latter is utilized to condense said water and gasoline, and before said first mentioned heating of the emulsion to pre-heat the latter.

References Cited in the file of this patent

UNITED STATES PATENTS

| Number | Name | Date |
|---|---|---|
| 2,016,642 | Lincoln | Oct. 8, 1935 |
| 2,167,160 | Raymond | July 25, 1939 |
| 2,181,687 | Walker | Nov. 28, 1939 |
| 2,261,101 | Erwin | Oct. 28, 1941 |
| 2,319,962 | Walker | May 25, 1943 |
| 2,342,950 | Lovelady et al. | Feb. 29, 1944 |
| 2,398,338 | Walker | Apr. 9, 1949 |
| 2,457,959 | Walker | Jan. 4, 1949 |
| 2,546,269 | Lovelady | Mar. 27, 1951 |
| 2,601,904 | Erwin | July 1, 1952 |
| 2,620,043 | Williams | Dec. 2, 1952 |
| 2,624,462 | Williams | Jan. 6, 1953 |